United States Patent
Bosworth et al.

(10) Patent No.: US 8,622,375 B2
(45) Date of Patent: Jan. 7, 2014

(54) DUAL FREQUENCY DAMPER FOR AN AIRCRAFT

(75) Inventors: Jeffrey Bosworth, Flower Mound, TX (US); Mithat Yuce, Argyle, TX (US); Frank B. Stamps, Colleyville, TX (US); Michael R. Smith, Colleyville, TX (US)

(73) Assignee: Textron Innovations Inc., Providence, RI (US)

(*) Notice: Subject to any disclaimer, the term of this patent is extended or adjusted under 35 U.S.C. 154(b) by 104 days.

(21) Appl. No.: 13/421,991

(22) Filed: Mar. 16, 2012

(65) Prior Publication Data

US 2013/0241124 A1    Sep. 19, 2013

(51) Int. Cl.
F16F 9/10 (2006.01)

(52) U.S. Cl.
USPC .......................... 267/140.11; 267/35

(58) Field of Classification Search
USPC ............. 188/297, 313, 316; 267/136, 140.11; 416/1
See application file for complete search history.

(56) References Cited

U.S. PATENT DOCUMENTS

| | | | |
|---|---|---|---|
| 4,236,607 A | | 12/1980 | Halwes et al. |
| 5,251,883 A | * | 10/1993 | Simon et al. ................. 267/136 |
| 5,501,434 A | * | 3/1996 | McGuire .................. 267/140.11 |
| 6,092,795 A | * | 7/2000 | McGuire .................. 267/140.11 |
| 2002/0154940 A1 | * | 10/2002 | Certain ........................... 403/24 |
| 2012/0051909 A1 | * | 3/2012 | McGuire ........................... 416/1 |
| 2012/0141276 A1 | * | 6/2012 | Fuhrer et al. ................. 416/140 |
| 2013/0164131 A1 | * | 6/2013 | Russell ............................. 416/1 |
| 2013/0189098 A1 | * | 7/2013 | Covington et al. ............... 416/1 |

FOREIGN PATENT DOCUMENTS

| | | |
|---|---|---|
| BE | 648762 A | 10/1964 |
| WO | 9906734 A1 | 2/1999 |
| WO | 2002060268 A1 | 5/2002 |

OTHER PUBLICATIONS

Extended European Search Report from European Patent Office in related European Patent Application No. 12165235, mailed Sep. 27, 2012, 6 pages.

* cited by examiner

*Primary Examiner* — Christopher Schwartz
(74) *Attorney, Agent, or Firm* — James E. Walton; J. Oliver Williams

(57) ABSTRACT

A dual frequency damper includes a liquid inertia vibration eliminator (LIVE) portion and a fluid damper portion. LIVE portion and fluid damper portion operate in series and function so that dual frequency damper is optimized in both stiffness and damping at multiple frequencies. LIVE portion acts as a frequency dependent switch to selectively cause low frequency oscillatory forces to be treated primarily by the high spring rate and high damping rate characteristics of the fluid damper portion, and also to select high frequency oscillatory forces to be primarily treated by the low spring rate and low damping rate characteristics of the LIVE unit portion.

12 Claims, 6 Drawing Sheets

DUAL FREQUENCY DAMPER FOR AN AIRCRAFT

BACKGROUND

1. Technical Field

The system of the present application relates to a damper for an aircraft. In particular, the system of the present application relates to a lead/lag damper for a rotorcraft. The damper is particularly well suited for use in the field of rotary wing aircraft; however, other types of aircraft can implement the damper as well. It should be appreciated that even though the damper is illustrated herein with regard to an aircraft, one ordinary skill in the art with benefit of this disclosure will recognize that the damper can be implemented in applications other than an aircraft.

1. Description of Related Art

Certain conventional rotorcraft can have multi-bladed rotor hub configurations that require lead/lag dampers to compensate for the acceleration and deceleration of each rotor blade about a rotor blade hinge axis. During forward flight of the rotorcraft, unequal drag forces on the advancing and retreating rotor blade positions typically cause oscillating forces that if left untreated, can negatively affect the rotorcraft. For example, untreated lead/lag oscillating forces can severely limit the life of structural components through fatigue. Furthermore, untreated lead/lag oscillating forces have been known to cause catastrophic results in a "ground resonance" phenomenon in which the oscillation frequency is similar to the resonant frequency of the aircraft on its landing gear.

Conventionally, lead/lag dampers are used to treat lead/lag oscillatory forces. However, considerably shortcomings in conventional lead/lag dampers remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
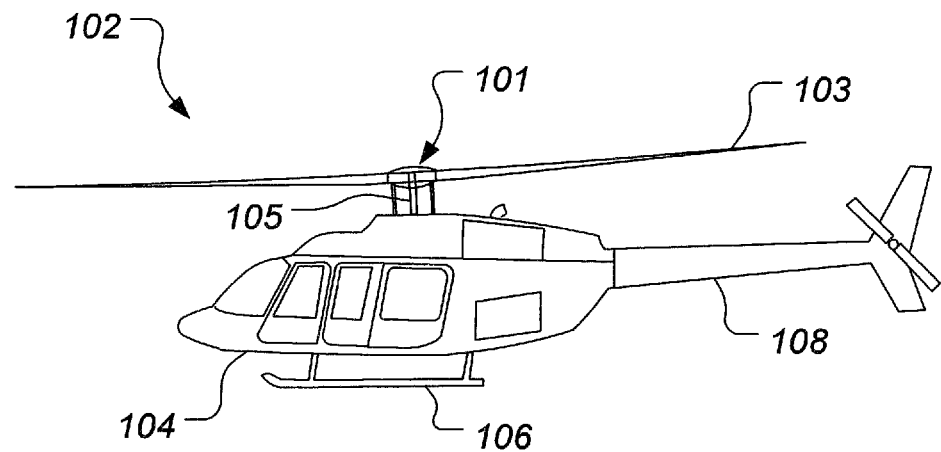
FIG. 1 is a side view of a rotorcraft, according to an embodiment of the present application.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1 in the drawings, a rotorcraft 102 is illustrated. Rotorcraft 102 has a rotor system 101 with a plurality of rotor blades 103. Rotorcraft 102 further includes a fuselage 104, landing gear 106, and an empennage 108. A main rotor control system can be used to selectively control the pitch of each rotor blade 103 in order to selectively control direction, thrust, and lift of rotorcraft 101. It should be appreciated that even though the system of the present application is depicted on a rotorcraft 101 having certain illustrated features, it should be appreciated that the system of the present application can be implemented on other rotorcraft and rotorcraft configurations, as one of ordinary skill in the art would fully appreciate having the benefit of this disclosure.

Figure 2:
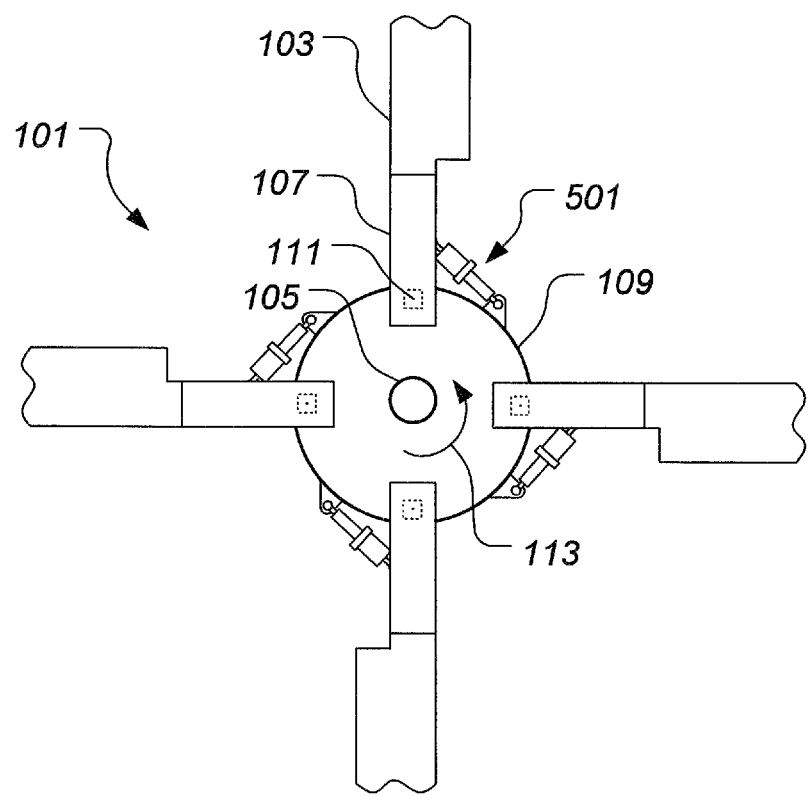
FIG. 2 is a top schematic view of a rotor hub, according to an embodiment of the present application.

Referring to FIG. 2, a rotor hub 101 for a rotorcraft includes a plurality of rotor blades 103 coupled to a central yoke 109, via a rotor grip 107. Yoke 109 is coupled to a rotor mast 105 such that rotation of rotor mast 105, in a direction 113, causes the yoke 109 and rotor blades 103 to rotate about the rotor mast axis of rotation. Each rotor blade 103 is preferably hinged about a hinge axis 111. Hinge axis 111 can be the result of a discreet hinge, or alternatively from a virtual hinge, or combination thereof. A dual frequency damper 501 is coupled between each rotor blade 103 and the rotor yoke 109. Dual frequency damper 501 is configured to dampen lead/lag oscillations during operation of the rotorcraft, as further described herein. It should be appreciated that the even though rotor hub 101 is illustrated with four rotor blades 103, the system of the present application is equally applicable to rotor hubs having an alternative number of rotor blades 103. Further, it should be appreciated that even though dual frequency damper 501 particularly well suited for a main rotor hub, as illustrated, dual frequency damper 501 may also be utilized on a tail rotor hub.

Figure 3:
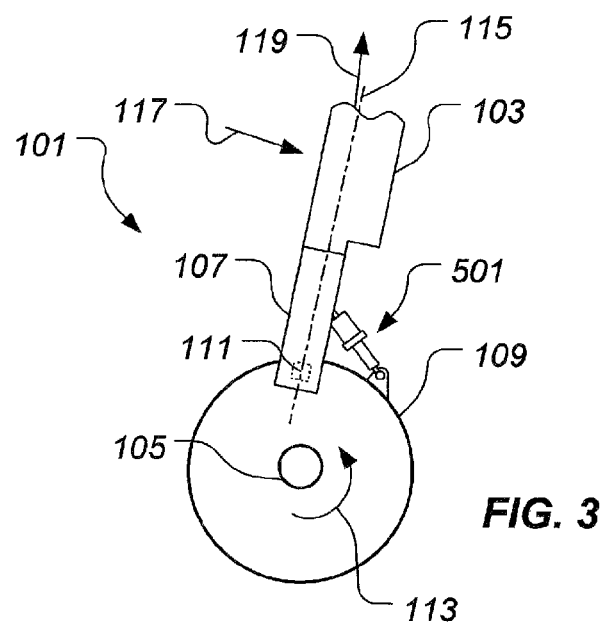
FIG. 3 is a top partial schematic view of the rotor hub, according to an embodiment of the present application.

Referring now to FIG. 3, rotor hub 101 is further illustrated. For clarity, only a single rotor blade 103 is shown; however, it should be appreciated that the disclosure regarding the rotor blade 103 is equally applicable to other rotor blades 103 that are not shown for clarity. During operation of the rotorcraft, rotor hub 101 is subjected to a variety of aerodynamic forces, as well as mechanical dynamic forces. Rotor hub 101 rotates around the rotor mast axis at approximately 300-350 revolutions per minute (RPM). However, it should be appreciated that the rate of rotation of rotor hub 101 is implementation specific; accordingly, the system of the present invention contemplates rotor hubs that rotate at other RPM's as well.

A centrifugal force 119 acts upon rotor blade 103 when rotor blade 103 is rotating around the rotor mast axis. Further, an aerodynamic drag force 117 imparts a restraining force upon the rotor blade 103. The centrifugal force 119 and aerodynamic drag force 117 create moments that act upon rotor blade 103. The damper 501 also creates a moment acting on the rotor blade 103. When the moments from the centrifugal force 119, the damper 501 and aerodynamic drag force 117 are balanced, then the rotor blade 103 is an equilibrium position, such as equilibrium position 115. However, when the centrifugal force 119, damper force 501 and aerodynamic drag force 117 change during operation of the rotorcraft, then a relatively steady force acts on rotor blade 103 until the relatively steady force repositions rotor blade 103 into a new equilibrium position.

Figure 4A:
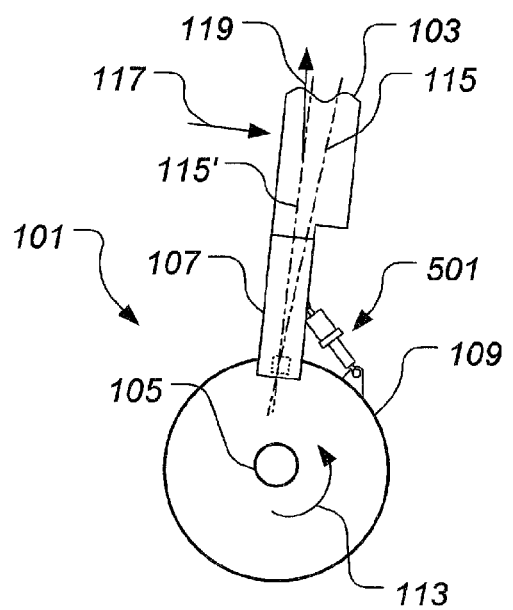
FIG. 4A is a top partial schematic view of the rotor hub, according to an embodiment of the present application.
Figure 4B:
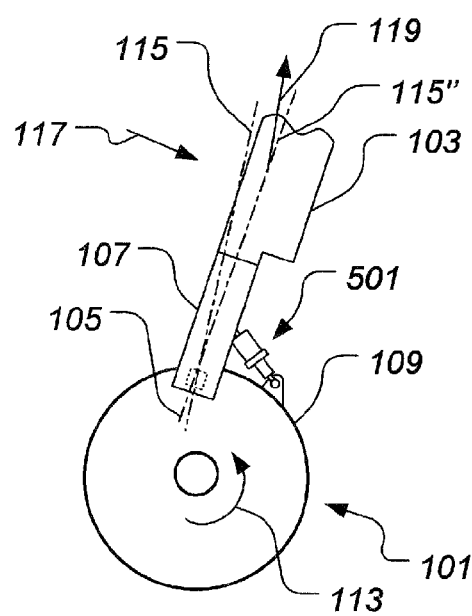
FIG. 4B is a top partial schematic view of the rotor hub, according to an embodiment of the present application.
Figure 5:
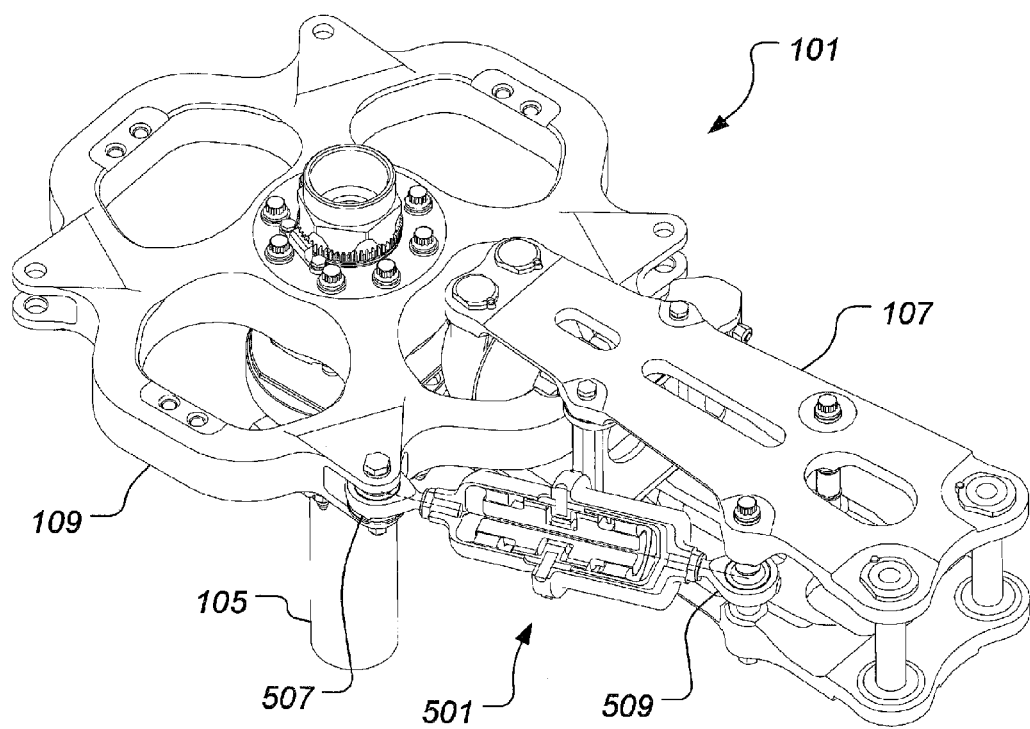
FIG. 5 is a perspective view of a rotor hub, according to an embodiment of the present application.
Figure 6:
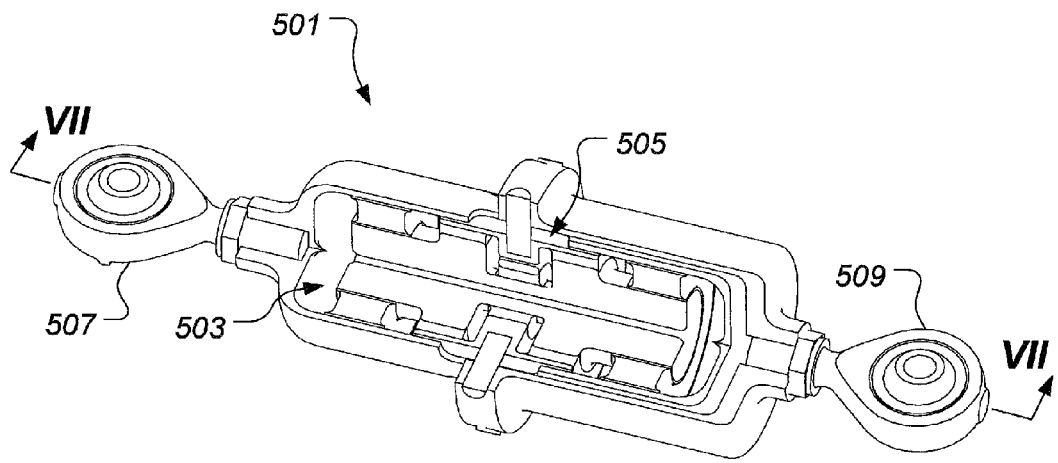
FIG. 6 is a partially removed perspective view of a dual frequency damper, according to the preferred embodiment of the present application.
Figure 7:
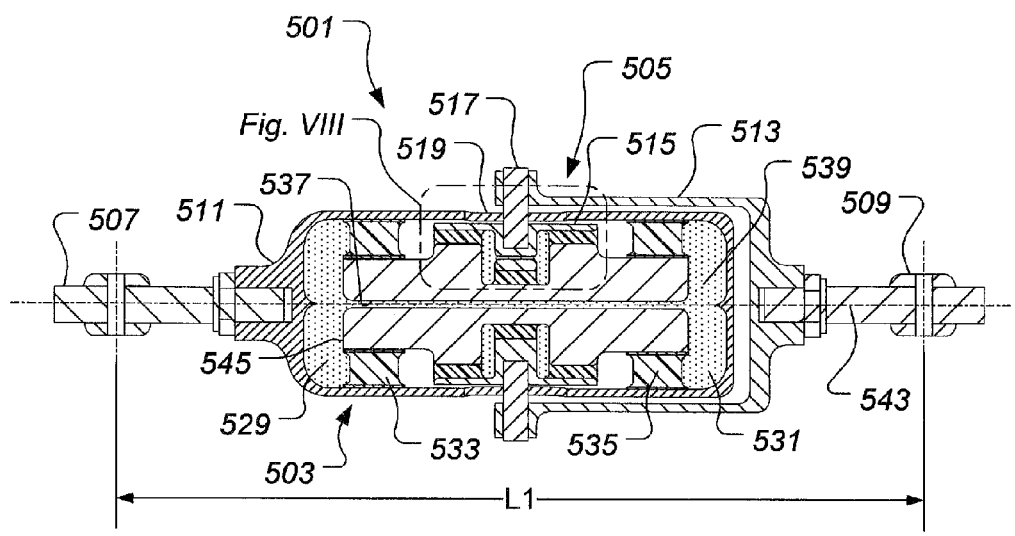
FIG. 7 is a cross-sectional view of the dual frequency damper of FIG. 6, taken at section lines VII-VII, according to the preferred embodiment of the present application.
Figure 8:
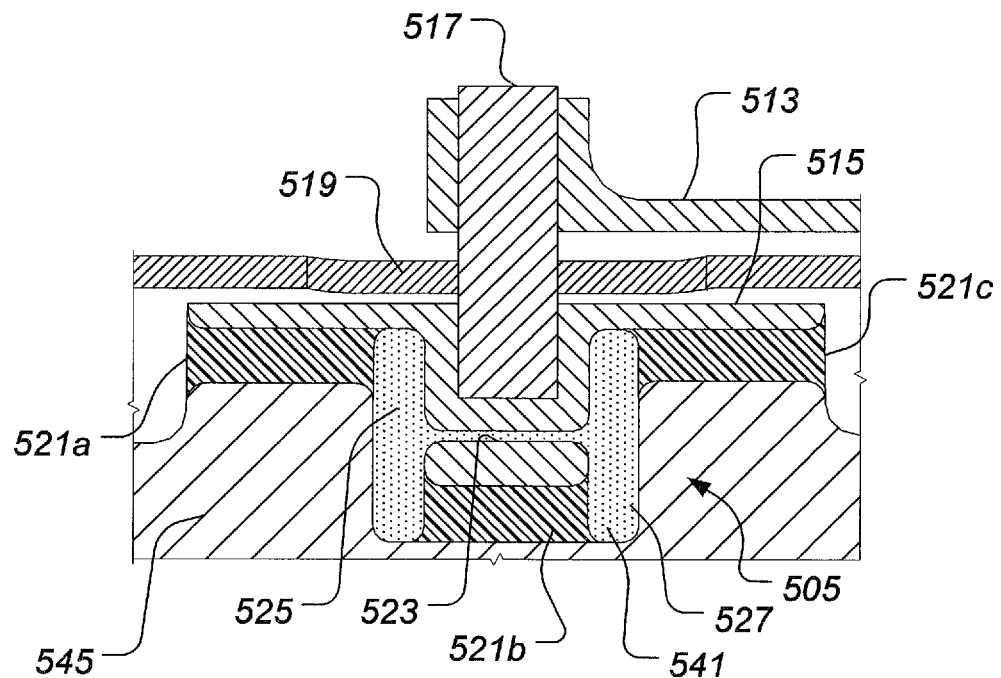
FIG. 8 is a detail view of the dual frequency damper of FIG. 6, taken at section lines VIII-VIII, according to the preferred embodiment of the present application.

Referring also to FIG. 4A, rotor blade 103 is shown in a forward position 115' in which the position of rotor blade 103 has deviated forwardly from equilibrium position 115. Referring also to FIG. 4B, rotor blade 103 is shown in an aft position 115" in which the position of rotor blade 103 has deviated aft of equilibrium position 115. These deviations of rotor blade 103 into a forward position 115' or an aft position 115", can be the result of a lead/lag force that imparts an oscillatory force facilitating the temporary positioning of rotor blade 103 in forward position 115' or aft position 115". When airflow resulting from a translation of the rotorcraft, or a wind gust, aligns with a directional position of rotor blade 103, then the temporary decrease in drag and additional damper force act to accelerate the rotor blade 103 during that rotational phase of the rotor blade 103, resulting in the temporary forward position 115'. In contrast, when the translation airflow direction opposes the directional position of rotor blade 103, then the temporary increase in drag and additional damper force act to decelerate the rotor blade 103 during that rotation phase of the rotor blade 103, resulting in the temporary aft position 115". These lead/lag forces act to accelerate and decelerate each rotor blade 103 within a single revolution about the rotor mast 105. It is highly desirable to efficiently and effectively treat the lead/lag forces, as well as other oscillatory forces, through damping.

Referring now to FIGS. 5-8, a dual frequency damper 501 is illustrated. Dual frequency damper 501 includes a liquid inertia vibration eliminator (LIVE) portion 503 and a fluid damper portion 505. LIVE portion 503 and fluid damper portion 505 operate in series and function selectively so that dual frequency damper 501 is optimized in both stiffness and damping at multiple frequencies, as discussed further herein.

Dual frequency damper 501 includes a first connection member 507 and a second connection member 509. One of the first connection member 507 and the second connection member 509 is coupled to the rotor yoke 109, while the other of the first connection member 507 and the second connection member 509 is coupled to the rotor grip 107 of rotor blade 103. It should be appreciated that the dual frequency damper 501 may be associated with the rotor hub 101 in a variety of configurations. Furthermore, dual frequency damper 501 may alternatively be coupled between adjacent rotor blades 103, instead of being coupled between the rotor blade 103 and rotor yoke 109. In the preferred embodiment, first and second connection members 507 and 509 are rod ends each having an integral spherical bearing; however, it should be appreciated that first and second connection members 507 and 509 may be of any configuration capable of providing a structural connection between rotor blade 103 and rotor yoke 109.

First connection member 507 is rigidly connected to a primary housing 511. Second connection member 509 is rigidly connected to an adapter housing 513. Adapter housing 513 and primary housing 511 are illustrated as having a substantially cylindrical shape; however, it should be appreciated that adapter housing 513 and primary housing 511 can be configured in a wide variety of shapes. Adapter housing 513 is rigidly coupled to a piston 515 of fluid damper portion 505 with a plurality of pins, such as pin 517. Each pin 517 extends in a radial direction and traverses through primary housing 511 through an associated void, such as void 519. It should be appreciated that it is fully contemplated that alternative mechanisms, other than adapter housing 513, can be used to rigidly couple second connection member 509 to piston 515. Fluid damper portion 505 further includes a first fluid chamber 525, a second fluid chamber 527, and a fluid passage 523. It should be appreciated that even though only one fluid passage 523 is illustrated in the illustration, a plurality of fluid passages 523 can be located radially around and parallel to a central damper axis 543. For example, one embodiment can have three fluid passages 523 located at 120° intervals around central damper axis 543. Fluid damper portion 505 also includes a fluid 541 disposed within first fluid chamber 525, second fluid chamber 527, and fluid passage 523. Fluid 541 is preferably a hydraulic fluid, but fluid 541 can be any variety of fluid types. Elastomer members 521*a*, 521*b*, and 521*c*, act in part to define and prevent fluid 541 from leaking out of first fluid chamber 525 and second fluid chamber 527. Further, elastomer members 521*a*, 521*b*, and 521*c*, are adhesively bonded between the interior of piston 515 and the exterior of a central member 545 so as to resiliently secure piston 515 to central member 545 of LIVE unit 503. Elastomer members 521*a*, 521*b*, and 521*c* include elastomeric material that has an implementation specific spring and damping rate. It should be appreciated that elastomer members 521*a*, 521*b*, and 521*c* may have a wide variety of configurations to tailor stiffness and damping properties. Elastomer members 521*a*, 521*b*, and 521*c* may be a solid elastomer member or a laminate of elastomer layers. Further, the laminate of elastomeric layers can include cylindrically shaped shims bonded therebetween. Further, the requisite length and thickness of elastomer members 521*a*, 521*b*, and 521*c* are implementation specific and depend in part on the predicted rotor hub dynamics and loading. The geometry and composition of elastomer members 521*a*, 521*b*, and 521*c* may be configured to provide linear or non-linear strain properties.

The LIVE unit portion 503 of dual frequency damper 501 includes a central member 545 resiliently coupled to primary housing 511 with a first elastomer member 533 and a second elastomer member 535. First elastomer member 533 and second elastomer member 535 function similar to a journal bearing, as discussed further herein. Central member 545 is also resiliently coupled to piston 515 of fluid damper portion 505 with elastomer members 521*a*, 521*b*, and 521*c*. A first fluid chamber 529 is formed by the interior space between a first end portion of primary housing 511 and central member 545 in conjunction with first elastomer member 533. Similarly, a second fluid chamber 531 is formed by the interior space between a second end portion of primary housing 511 and central member 545 in conjunction with second elastomer member 535. A tuning passage 537 is located through an interior of central member 545 along damper axis 543. Tuning passage 537 provides fluid communication between first fluid chamber 529 and second fluid chamber 531.

A tuning fluid 539 is disposed in first fluid chamber 529, second fluid chamber 531, and tuning passage 537. Tuning fluid 539 preferably has low viscosity, relatively high density, and non-corrosive properties. Other embodiments may incorporate hydraulic fluid having suspended dense particulate matter, for example. Furthermore, in one embodiment, tuning fluid 539 can be the same as fluid 541 used in fluid damper portion 505.

A conventional LIVE unit is disclosed in U.S. Pat. No. 4,236,607, titled "Vibration Suppression System," issued 2 Dec. 1980, to Halwes, et al. (Halwes '607). Halwes '607 is incorporated herein by reference. Halwes '607 discloses a a conventional vibration isolator, in which a tuning fluid is used as the "tuning" mass to counterbalance, or cancel, oscillating forces transmitted through the isolator. This isolator employs the principle that the acceleration of an oscillating mass is 180° out of phase with its displacement. In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration.

A simple force equation for vibration is set forth as follows:

$$F = m\ddot{x} + c\dot{x} + kx$$

A conventional LIVE unit utilizes inertial forces ($m\ddot{x}$) to cancel elastic forces ($kx$). As such, conventional LIVE units have sought to minimize undesired damping since in contrast to a vibration isolator device, a damping device is primarily concerned with utilizing dissipative effects ($c\dot{x}$) to remove energy from a vibrating system.

However, in contrast to a conventional LIVE unit, LIVE unit portion 503 of dual frequency damper 501 is primarily configured as a frequency dependent switch so that dual frequency damper 501 is optimized in both stiffness and damping at multiple frequencies, as discussed further herein.

Figure 9:
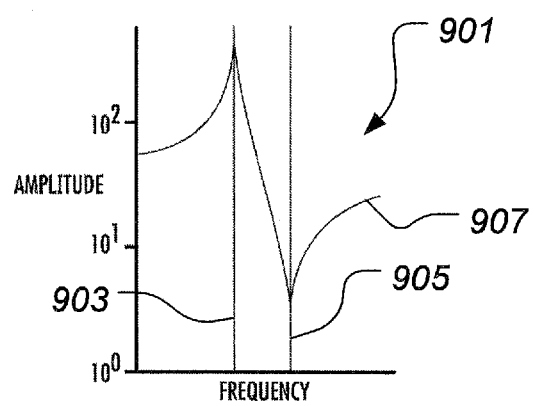
FIG. 9 is a graph illustrating an exemplary liquid inertia vibration eliminator (LIVE) unit response plot line in terms of frequency and amplitude, according to the preferred embodiment of the present application.

Referring briefly to FIG. 9, a graph 901 illustrates a LIVE unit response plot line 907 graphed in terms of frequency and amplitude. Plot line 907 is illustrative of a response of a LIVE unit to an oscillatory force where instance 903 is the natural frequency while instance 905 is the isolation frequency. LIVE unit portion 503 acts as a frequency dependent switch by being configured such that an oscillatory force exhibited upon dual frequency damper 501 at frequencies near instance 903 cause a behavioral response from LIVE unit portion 503 of high stiffness. At these frequencies near instance 903, LIVE unit portion 503 essentially locks-up and becomes rigid, thereby causing fluid damper 505 to substantially react the forces exhibited upon dual frequency damper 501. When fluid damper 505 reacts the forces exhibited upon dual frequency damper 501, then the spring rate and damping characteristics of fluid damper 505 are manifested as the total spring rate and damping characteristics of dual frequency damper 501. Further, when an oscillatory force is exhibited upon dual frequency damper 501 at frequencies near instance 905, LIVE unit portion 503 behaves with relatively low stiffness. When LIVE unit portion 503 behaves with low stiffness, fluid damper 505 comparatively exhibits a high stiffness, thereby causing LIVE unit portion 503 to substantially react the oscillatory forces while fluid damper 505 behaves relatively rigid. Moreover, because the spring constant (K) of first elastomer member 533 and second elastomer member 535 are relatively low compared to the spring constant (K) of elastomer members 521*a*, 521*b*, and 521*c*, then the dual frequency damper 501 operates with relatively low stiffness at force oscillations at frequencies near instance 905 on graph 901.

Figure 10:
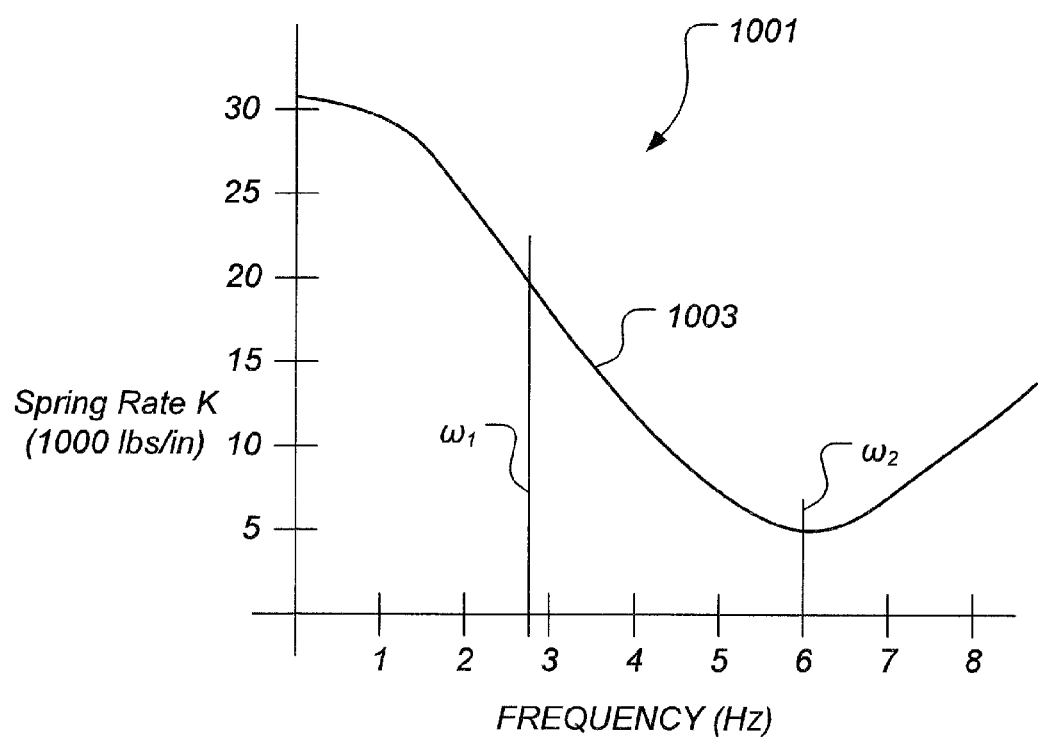
FIG. 10 is a graph illustrating an exemplary stiffness curve of the dual frequency damper, according to the preferred embodiment of the present application.

Referring now also to FIG. 10, a graph 1001 includes an illustrative stiffness curve 1003 of dual frequency damper 501. It should be appreciated that stiffness curve 1003 is merely exemplary of an embodiment of dual frequency damper 501 during operation. Other implementation specific embodiments of dual frequency damper 501 can have stiffness curves that deviate and differ from stiffness curve 1003. $\omega_1$ represents a rotor blade rotational frequency of approximately 2.82 Hz (0.47/rev). $\omega_2$ represents a rotor blade rotational frequency of approximately 6 Hz (1/rev). At $\omega_1$, dual frequency damper 501 is tuned so that LIVE unit portion 503 acts relatively stiff and rigid, thereby causing the spring rate, damping rate, and displacement characteristics of fluid damper portion 505 treat the oscillatory forces. In the illustrated embodiment, fluid damper portion 505 has a spring rate of approximately 20,000 lbs/in at $\omega_1$. At $\omega_1$, LIVE unit portion 503 behaves similar to instance 903 in graph 901 in FIG. 9. It should be appreciated that is not necessary for $\omega_1$ to correspond exactly with the peak amplitude shown at instance 903; rather $\omega_1$ can correspond with either side of the peak at instance 903 on plot line 907.

Still referring to FIG. 10, at $\omega_2$, dual frequency damper 501 is tuned so that LIVE unit portion 503 acts relatively soft and compliant, thereby causing fluid damper portion 505 to act relatively stiff and rigid, which in turn causes the spring rate, damping rate, and displacement characteristics of LIVE unit portion 503 to treat the oscillatory forces. In the illustrated embodiment, LIVE unit portion 503 has a spring rate of approximately 5,000 lbs/in at $\omega_2$. At $\omega_2$, LIVE unit portion 503 behaves similar to instance 905 in graph 901 if FIG. 9. It should be appreciated that is not necessary for $\omega_2$ to correspond exactly with the lowest dip amplitude shown at instance 905; rather $\omega_2$ can correspond with either side of the dip at instance 905 on plot line 907. It should be appreciated that operational conditions between $\omega_1$ and $\omega_1$ result in a combination of contributions from LIVE unit portion 503 and fluid damper portion 505.

Referring again also to FIGS. 5-8, when LIVE unit portion 503 behaves rigid, such as at a frequency of 0.47/rev ($\omega_1$), loading is reacted by fluid damper portion 505. During such a situation, a length L1 of dual frequency damper 501 is compressed and stretched during the loading cycle, thereby translating piston 515 relative to central member 545 along damper axis 543. Translation of piston 515 forces elastomer members 521a, 521b, and 521c to elastically deform through shear, thereby treating the oscillatory force with a spring rate and damping rate. Further, the relative translation of piston 515 relative to central member 545 forces fluid 541 through fluid passage 523 between first fluid chamber 529 and second fluid chamber 531. The viscous damping that results from the fluid transfer through fluid passage 523 also results in damping of the oscillatory force causing the translation of piston 515 relative to central member 545.

In an alternative embodiment of dual frequency damper 501, fluid damper portion 505 can rely solely upon elastomer members, such as elastomer members 521a, 521b, and 521c, for spring and damping characteristics. More specifically, an alternative embodiment of fluid damper portion 505 can be void of first fluid chamber 529, second fluid chamber 531, and fluid passage 523.

Dual frequency damper 501 has significant advantages over conventional dampers. For example, by configuring and implementing live unit as a frequency dependent switch, so as to activate the dual frequency damper 501 to treat oscillatory forces at a first frequency with the fluid damper portion 505 having a high spring rate, high damping rate, and low displacement factor, while treating oscillatory forces at a second frequency with the LIVE unit portion 503 with a low spring rate, low damping rate, and high displacement factor. Further, oscillatory forces at frequencies between the first frequency and the second frequency are treated with a combination of LIVE unit portion 503 and fluid damper portion 505. In such a manner, the dual frequency damper 501 can be selectively optimized at multiple frequencies, thereby allowing for lower loads and/or higher damping for a given design configuration. Further, having two distinct components, namely the LIVE unit portion 503 and the fluid damper portion 505, allows for each component to be selectively tailored for an implementation specific design configuration.

The invention claimed is:
1. A dual frequency damper for a rotorcraft, the dual frequency damper comprising:
   a first connection member;
   a second connection member;
   a vibration eliminator portion comprising:
      a primary housing coupled to the first connection member;
      a central member resiliently attached to the primary housing with an inboard elastomer member and an outboard elastomer member;
      a tuning passage located in the central member, the tuning passage configured to provide fluid communication between an inboard fluid chamber and an outboard fluid chamber;
      a tuning fluid disposed in the tuning passage, inboard fluid chamber, and the outboard fluid chamber;
   a fluid damper portion comprising:
      a piston rigidly coupled to the second connection member, the piston dividing an interior of the first housing into a first fluid chamber and a second fluid chamber;
      a fluid passage in the piston, the fluid passage being configured to provide fluid communication between a first fluid chamber and a second fluid chamber; and
      a fluid disposed in the fluid passage, the first fluid chamber, and the second fluid chamber;
   wherein the piston is resiliently coupled to the central member of the vibration eliminator portion.

2. The dual frequency damper according to claim 1, wherein the vibration eliminator portion is configured to behave rigidly when the dual frequency damper is subjected to an oscillatory force at a first frequency.

3. The dual frequency damper according to claim 2, wherein the first frequency is less than a rotational frequency.

4. The dual frequency damper according to claim 2, wherein the vibration eliminator portion is configured to behave softly when the dual frequency damper is subjected to an oscillatory force at a second frequency.

5. The dual frequency damper according to claim 4, wherein the second frequency is greater than the first frequency.

6. The dual frequency damper according to claim 4, wherein the second frequency has a higher Hertz value than the first frequency.

7. The dual frequency damper according to claim 1, wherein the piston is resiliently coupled to the central member with an elastomer member.

8. The dual frequency damper according to claim 1, wherein the vibration eliminator portion is configured to behave rigidly when the dual frequency damper is subjected to a force occurring at a lead/lag mode frequency, there by causing the force to be treated by the fluid damper portion.

9. The dual frequency damper according to claim 1, wherein the dual frequency damper is configured for attachment between a rotor blade and a rotor yoke.

10. The dual frequency damper according to claim 1, wherein the dual frequency damper is configured for attachment between adjacent rotor blades.

11. The dual frequency damper according to claim 1, wherein the fluid damper portion is configured to dampen a lead/lag oscillatory motion and provide spring force to adjust a lead/lag mode frequency.

12. The dual frequency damper according to claim 11, wherein the oscillatory motion occurs at a lead/lag mode frequency and higher.

* * * * *